United States Patent [19]

Thompson et al.

[11] 4,273,445
[45] Jun. 16, 1981

[54] INTERFEROMETER GYROSCOPE FORMED ON A SINGLE PLANE OPTICAL WAVEGUIDE

[75] Inventors: David E. Thompson, Placentia; Shi-Kay Yao, Brea; Rudolf R. August, Laguna Beach; Dean B. Anderson, Whittier, all of Calif.

[73] Assignee: Rockwell International Corporation, El Segundo, Calif.

[21] Appl. No.: 62,210

[22] Filed: Jul. 30, 1979

Related U.S. Application Data

[63] Continuation-in-part of Ser. No. 936,678, Aug. 23, 1978.

[51] Int. Cl.$^3$ .............................................. G01C 19/64
[52] U.S. Cl. ................................. 356/350; 350/96.11; 350/96.17
[58] Field of Search ............................ 356/350, 351; 350/96.11, 96.17

[56] References Cited

U.S. PATENT DOCUMENTS

| | | | |
|---|---|---|---|
| 3,994,559 | 11/1976 | Crow | 350/96.17 |
| 4,013,365 | 3/1977 | Vail et al. | 331/94.5 C |
| 4,120,588 | 10/1978 | Chaum | 356/350 |
| 4,133,612 | 1/1979 | Redman | 356/350 |
| 4,138,196 | 2/1979 | Redman | 356/350 |
| 4,208,128 | 6/1980 | Thompson et al. | 356/350 |

Primary Examiner—Vincent P. McGraw
Attorney, Agent, or Firm—Richard A. Bachand; H. Fredrick Hamann

[57] ABSTRACT

A Sagnac interferometer gyroscope includes a semiconductor chip on which is formed an optical waveguide. Means are provided on the optical waveguide to inject a laser light beam into the waveguide and onto a divider to produce first and second divided beams. Second and third dividers are provided in the waveguide to generate a reference signal onto a pair of photodectors disposed to receive the divided light waves. The light waves are modulated with first and second frequencies prior to their second division by a pair of Bragg frequency shifter interdigital transducers. The divided and modulated light beams are then directed through an optical path encompassing an axis of sensitivity of the gyro. In one embodiment the path is formed by an optical fiber with connections to the chip. In another embodiment the optical path is defined within the chip itself by reflectors or deflectors at selected locations about the peripheral of the chip. The respective light beams after having traversed the light path are then combined and detected by a second pair of photodectors. The signals of the photodectors are compared to determine the rotation of the gyroscope about the axis of sensitivity.

24 Claims, 8 Drawing Figures

INTERFEROMETER GYROSCOPE FORMED ON A SINGLE PLANE OPTICAL WAVEGUIDE

CROSS REFERENCE TO RELATED APPLICATIONS

This patent application is a continuation-in-part of the copending patent application Ser. No. 936,678, filed Aug. 23, 1978.

BACKGROUND OF THE INVENTION

1. Field of the Invention

This invention relates to interferometer gyroscopes, and more particularly to an interferometer gyroscope of which at least a portion of the gyroscope is to be formed as an integrated optics structure or surface guided wave structure.

2. Description of the Prior Art

Interferometer gyroscopes, including so-called Sagnac interferometer gyroscopes, have been becoming of increased interest for widespread application, in such as inertial navigation instruments, attitude and heading indicating or controlling devices, or the like.

Recently, it was discovered that a convenient light path can be established with the use of an optical fiber formed in a coil or solenoid encircling an axis of rotational sensitivity. Such gyroscope is taught, for example, in U.S. Pat. No. 4,013,365.

It was later discovered that by modulating the light beams in each counter-rotating direction with respective different frequencies, the signal processing thereof can be accomplished electronically with greater resolution and with a high degree of simplicity at lower, non-lightwave frequencies.

In navigation applications, one objective is to minimize or reduce the size of the overall gyroscope to as great an extent as possible. Another is to consolidate the various elements of the gyroscope as much as possible to reduce problems encountered in interfacing between various light conducting mediums.

SUMMARY OF THE INVENTION

In view of the above, it is an object of the invention to provide an improved Sagnac interferometer gyroscope.

It is another object of the invention to provide such gyroscope with reduced physical dimensions.

It is still another object of the invention to provide a gyroscope of the type described in which the optical path can be wholly self-contained on a single substrate.

These and other objects, features and advantages will become apparent from the following detailed description when read in conjunction with the accompanying drawings and appended claims.

The invention, in its broad aspect, presents an interferometer gyroscope formed upon a planar optical waveguide. Light from a source of laser light is introduced into the planar optical waveguide onto a means for dividing the laser light into first and second beams in the waveguide. Means are provided for directing the first and second beams in opposite directions along a path having an axis of rotational sensitivity. Means are also provided for receiving the first and second beams from the path and for directing the first and second beams in the planar optical waveguide for detection. Finally, means are provided for detecting a phase difference between the received first and second beams to indicate a rotation of the gyroscope about the axis of rotational sensitivity. In one embodiment, the path having an axis of rotational sensitivity is provided by an optical fiber coil or solenoid configured about the axis of rotational sensitivity. In another embodiment, the path is formed upon the optical waveguide together with the laser light dividing, directing, receiving, and detecting means to provide a single unit.

BRIEF DESCRIPTION OF THE DRAWING

The invention is illustrated in the accompanied drawing, wherein.

Figure 1:
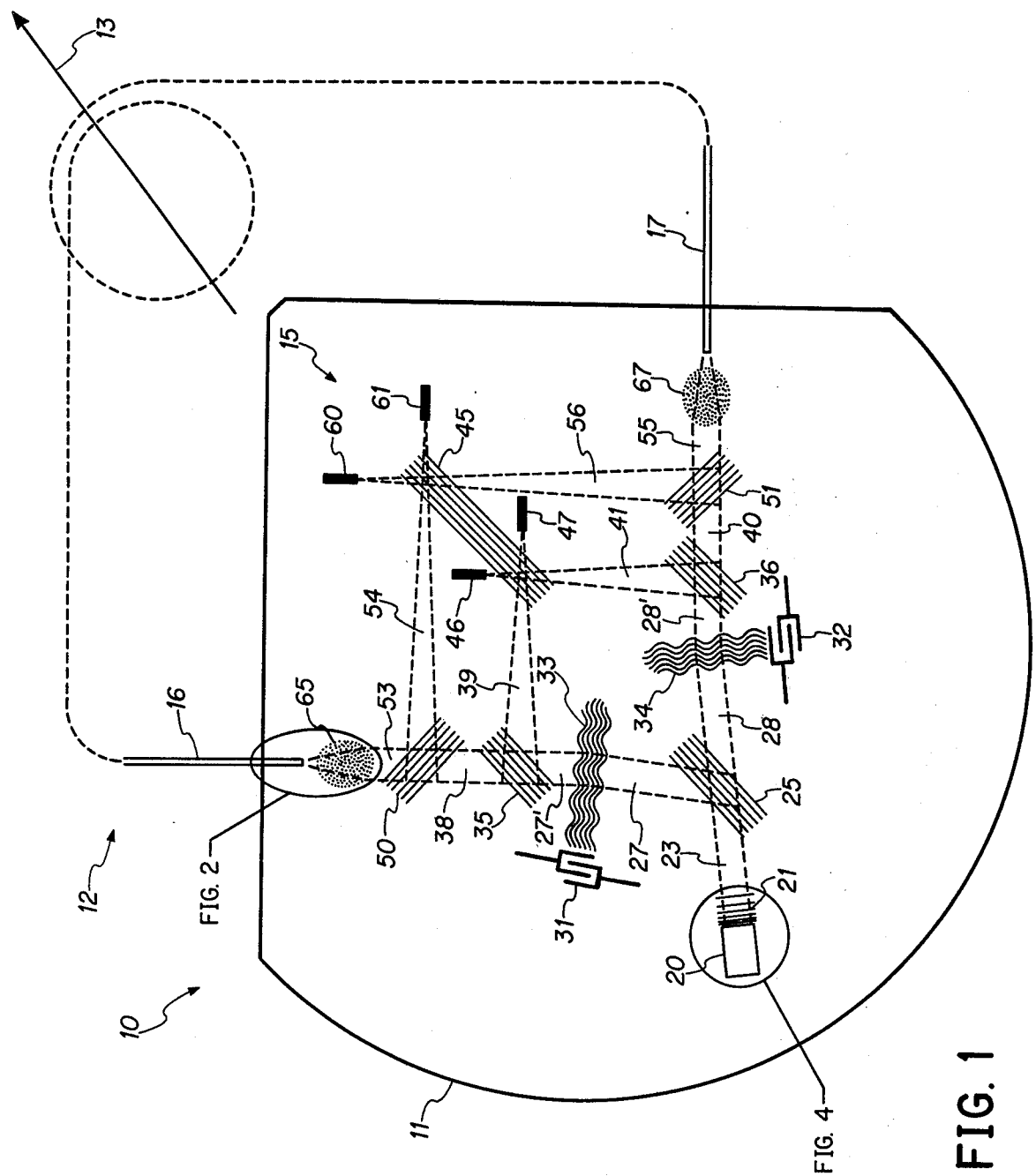
FIG. 1 is a diagrammatic illustration of a plan view of an interferometer gyroscope incorporating the principles of the invention in accordance with a preferred embodiment thereof, in which the optical path encompassing an axis of sensitivity is external to a signal generating and processing chip.

In the various figures of the drawing, the sizes and dimensions of various parts have been exaggerated or distorted for ease of description and clarity of illustration.

DETAILED DESCRIPTION OF THE PREFERRED EMBODIMENTS

The interferometer in accordance with the invention is formed with at least the optical processing and generating portions carried upon or formed as part of a single substrate. Optical waveguides formed upon substrates are known in the art, such waveguides being formed, for example on insulators, conductors, or semiconductors, for instance, on a silicon (Si) substrate having an overlying isolation layer and a second overlying silicon dioxide layer. If needed, a superstrate of, for instance, glass sold under the Trademark "7059" by Owing Corning Glass Corporation, can be formed over the silicon dioxide waveguide. Appropriate defusions may be included in the formation of the silicon dioxide waveguide in thermal oxide formation processes to decrease the scattering loss properties of the waveguide, if desired.

It should also be noted that although the gyroscope is described herein as being formed with a silicon substrate having an overlying silicon dioxide optical waveguide, other materials can be equally advantageously employed in the formation of the substrate and waveguide. Also, it will be appreciated that although a wide range of materials can be used for the substrate, a substrate of semiconductor material is preferred in many applications to easily achieve a monolithic structure and to reduce alignment mismatch problems, as will be apparent below. For example, in addition to silicon, it has been found that a gallium arsenide (GaAs) is suitable for use as a substrate, with an overlying waveguide layer of gallium aluminum arsenide (GaAl)As and with a superstrate of gallium arsenide (GaAs). Likewise, it has been found that cadmium selenide (CdSe) can be used as such substrate, with an overlying waveguide layer of cadmium sulfide (CdS), and with a superstrate layer of cadmium selenide (CdSe). Other suitable materials will be apparent to those skilled in the art.

It should be noted that by proper fabrication techniques, in the formation of the waveguide in its thickness and other physical parameters, the waveguide can be designed to support only a single mode of light therein. Such parameter design considerations for supporting single mode propogation are set forth by T. K. Tien in "Light Waves in Thin Films and Integrated Optics" in *Applied Optics*, Nov., 1971, p. 2395 et seq.

A Sagnac interferometer gyroscope, in accordance with the invention, is shown in FIG. 1 and denoted generally by the reference numeral 10. The interferometer 10 is formed upon a single silicon chip waveguide 11, formed as above described. In the interferometer 10, an optical path is provided by an optical fiber 12 which includes a portion encircling an axis 13, the rotation about which is desired to be measured. (This axis is herein referred to as the axis of rotational sensitivity). In the embodiment of FIG. 1, the optical fiber 12 is arranged external to the chip 11, with optical connection to the chip 11 at each of its ends 16 and 17 in a manner below described in detail with reference to FIGS. 2 and 3.

The signal generating and processing portion 15 carried by or formed into the semiconductor-waveguide 11 are as follows. A distributed-feedback gallium aluminum arsenide (GaAl)As injection laser 20 is located above a chirp grating coupler 21, in a fashion decribed below in detail with respect to FIGS. 4 and 5. The laser 20 injects a collimated beam 23 into the waveguide in a direction to strike a grating beamsplitter 25, formed in a manner known in the art. The grating beamsplitter 25 divides the collimated beam 23 into two portions, 27 and 28.

First and second Bragg-type frequency shifter interdigital transducers 31 and 32 are formed in the silicon chip waveguide 11 to produce surface acoustic waves, represented by wavy lines 33 and 34, respectively, across the path of the light beams 27 and 28 within the waveguide 11. The Bragg-type frequency shifter interdigital transducers 31 and 32 thus produce modulated beam 27' and 28' modulated, respectively, at first and second frequencies in accordance with the frequency provided by respective external oscillators (not shown).

The modulated beams 27' and 28' are directed onto respective grating beamsplitters 35 and 36 to form respectively beam pairs 38 and 39, 40 and 41. The beams 39 and 41 are directed within the waveguide 11 onto a transmission-grating, Bragg-type deflector 45 to fall onto photodetectors 46 and 47. The transmission grating, Bragg-type deflector 45 functions to permit one-half of the beam 41 to fall onto the photodector 47, and like fashion, to permit one-half of the beam 39 to fall onto photodector 47, while deflecting one-half of the beam 39 onto the photodector 46, and deflecting one-half of the beam 47 onto the photodector 47.

The beams 38 and 40 are directed within the waveguide 11 onto respective grating beamsplitters 50 and 51, to pass therethrough and to be focused by respective Luneburg lenses 65 and 67 to a point sufficient to enter the optical fiber 12 at the respective ends 16 and 17. The Luneburg lenses 65 and 67 also receive light exiting from the respective ends 16 and 17 of the optical fiber 12 to collimate to direct the returned light beams 53 and 55 onto grating beam splitters 50 and 51. The light beams 53 and 55 are reflected by beam splitters 50 and 51 to be transmitted along beam paths 54 and 56 onto the photodiodes 60 and 71 via grating 45, in a fashion similar to that above described with reference to photodiodes 46 and 47 and beams 39 and 41.

Figure 2:
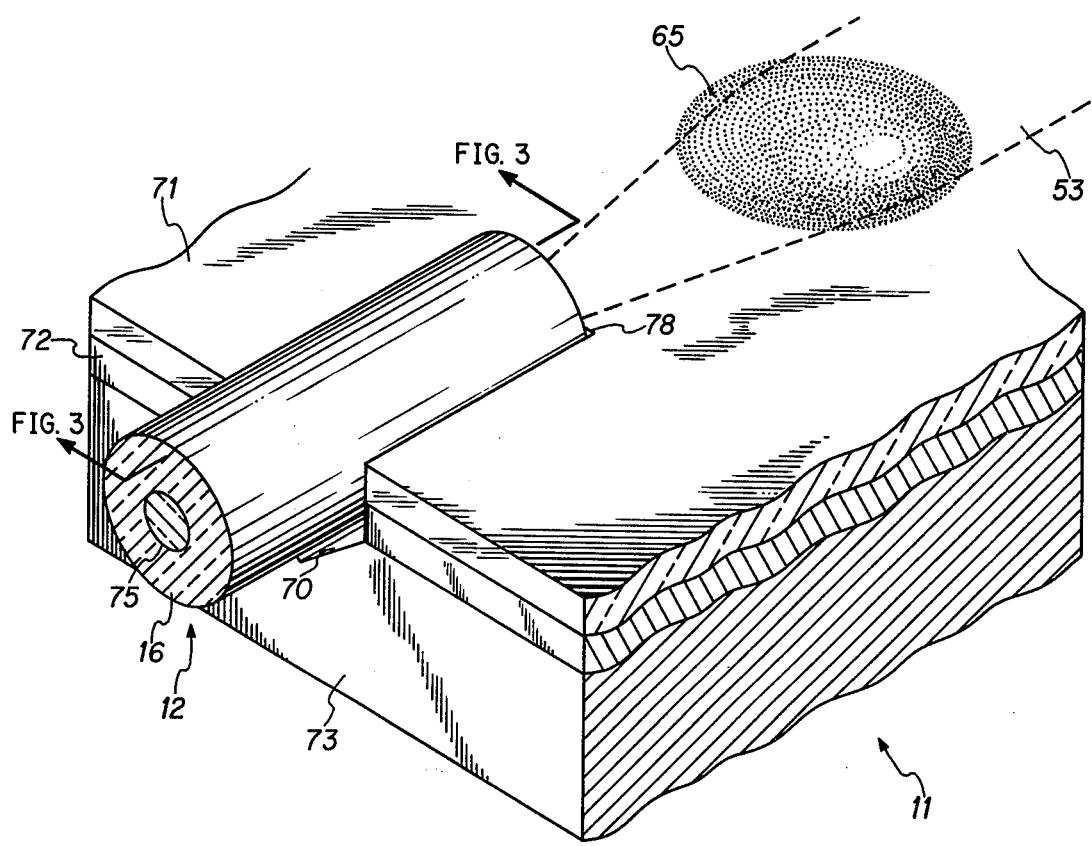
FIG. 2 is a perspective view of a portion of the gyroscope of FIG. 1 taken at the encircled portion marked "FIG. 2", showing the connection of the optical fiber to the waveguide substrate.
Figure 3:
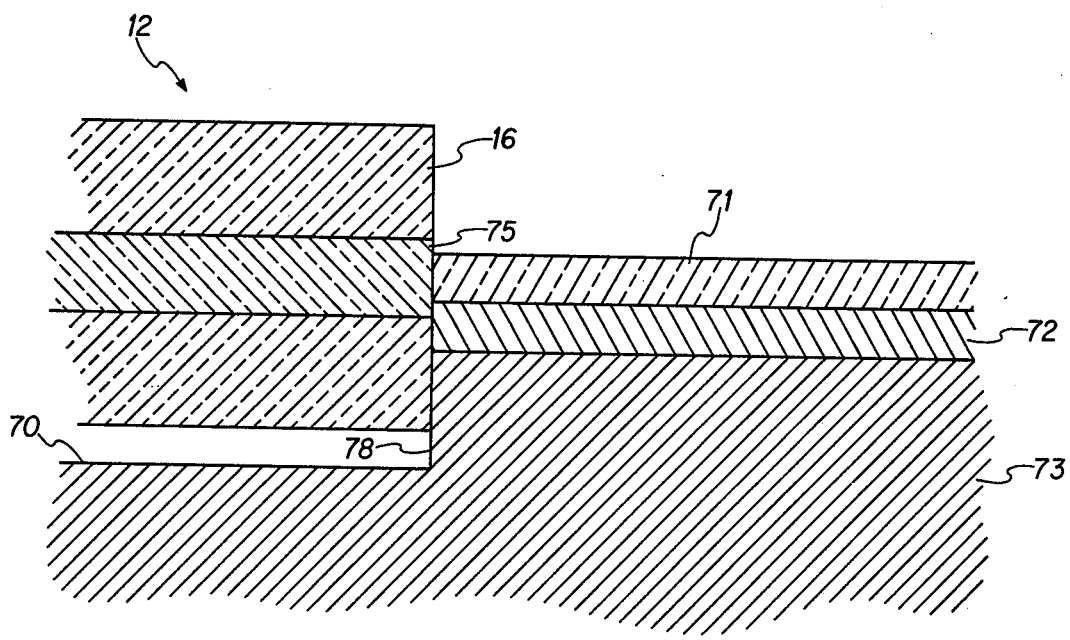
FIG. 3 is a side elevation of the gyroscope of FIG. 2, taken at 3—3 in FIG. 2, showing the relationship of the optical fiber and the waveguide substrate.

With reference now to FIGS. 2 and 3, the connection of the optical fiber to the semiconductor waveguide is shown. In FIGS. 2 and 3, the connection of end 16 is shown, however, it is understood that end 17 is connected to the semiconductor waveguide in a similar fashion.

A preferentially etched groove 70 is formed through the in-diffused waveguide 71, the isolation silicon dioxide layer 72 and the underlying silicon substrate 73, as shown, to receive a portion of the end 16 of the optical fiber 12. The groove 70 is formed to a depth sufficient to bring the core 75 of the optical fiber 14 into alignment with the waveguide 71, as can be seen in the side view of FIG. 3. The end 78 of the groove 70 is formed to be essentially in square alignment and in contact with the fiber core 75, whereby when light is directed in the waveguide 71 in the direction of the fiber 12, or within the fiber 12 in the direction of the waveguide 71, it will be transmitted across the interface between the fiber core 75 and waveguide 71. The end 16 of the optical fiber 12 is mechanically affixed or adhered to the semiconductor chip 11 by a mechanical glue, such as epoxy. In addition, the fiber core 75 is glued to the waveguide 71 by an optical glue, such as an optically transparent epoxy. Thus, both mechanical and optical connection between the semiconductor chip 11 and the optical fiber 12 are provided. As mentioned above, a Luneburg lens 65 is provided near the end 18 to focus the collimated beam 53 to enable it to efficiently enter the fiber core 75; and, similarly, to collimate the light exiting the fiber 12 which is within the waveguide 71. The Luneburg lens 65 may for example, be of tantalum pentoxide ($Ta_2O_5$) formed by well known techniques.

Figure 5:
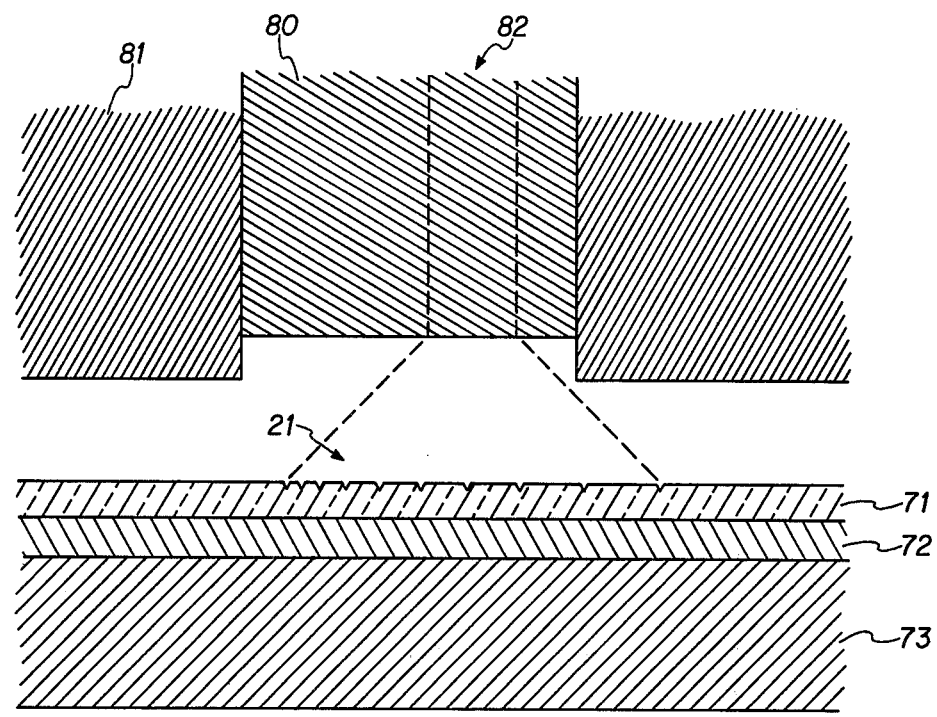
FIG. 5 is a side elevation of a portion of the gyroscope of FIG. 4, taken at 5—5.
Figure 4:
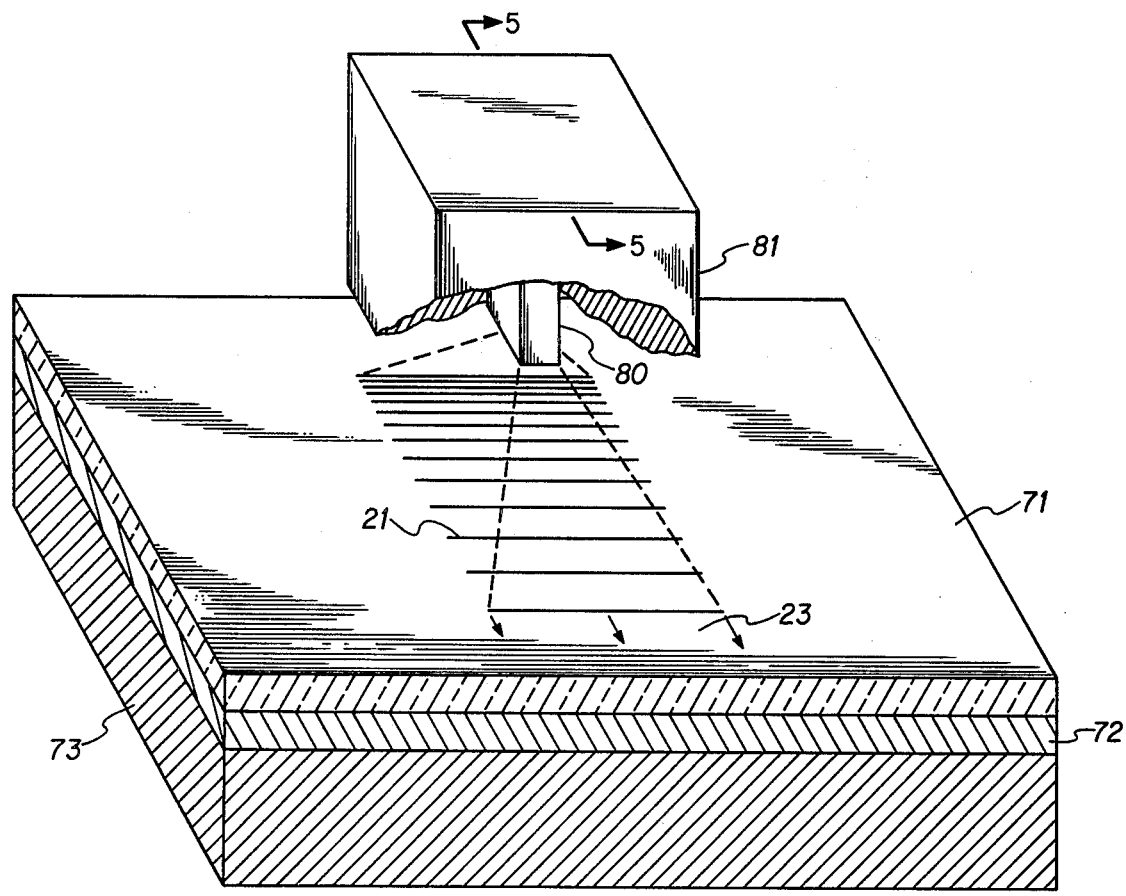
FIG. 4 is a perspective exploded view of a portion of the gyroscope of FIG. 1 taken at the encircled portion marked "FIG. 4", showing the interrelationship of the laser source of the waveguide.

The (GaAl)As distributed feedback laser mounting is shown in FIGS. 4 and 5. As shown, a chirped grating 21 is formed in the waveguide layer 71 to direct a beam impingent thereupon in the desired direction. The (GaAl)As laser chip 80 is contained within a heat sink block 81 in ohmic contact therewith. The heat sink 81 carries the laser chip above the chirped grating 21 to enable the laser light from the laser chip 80 to fall substantially over the surface area of the chirped grating 21, as shown. Thus, as can be seen from FIG. 5, the laser light within the optical confinement region 82 of the laser 80 falls onto the chirped grating 21 for use in the remaining parts of the circuit as above described.

The Sagnac interferometer circuit, as configured above, with appropriate connections to the photodiodes 46, 47, 60, and 61, and the Bragg-type frequency shifter interdigital transducers 31 and 32, can be used in a circuit configuration known in the art. One example of such circuit configuration can be seen in our parent copending U.S. patent application Ser. No. 936,678, filed Aug. 23, 1978, and entitled, "Interferometer Gyro Using Heterodyne Phase Detection Without Severe Light Source Coherence Requirements", by the applicants hereof, and assigned to the assignee hereof. Said parent application Ser. No. 936,678 is incorporated herein by reference. In operation, the interferometer gyroscope functions in the same fashion as the interferometer gyroscope in said patent application Ser. No. 936,678. When a rotation of the optical fiber 12 about the axis of sensitivity 13 occurs, a measurable difference in the phase detected by the respective photodetector pairs 46 and 47 and pairs 60 and 61 can be measured indicative of the rate of rotation.

Figure 6:
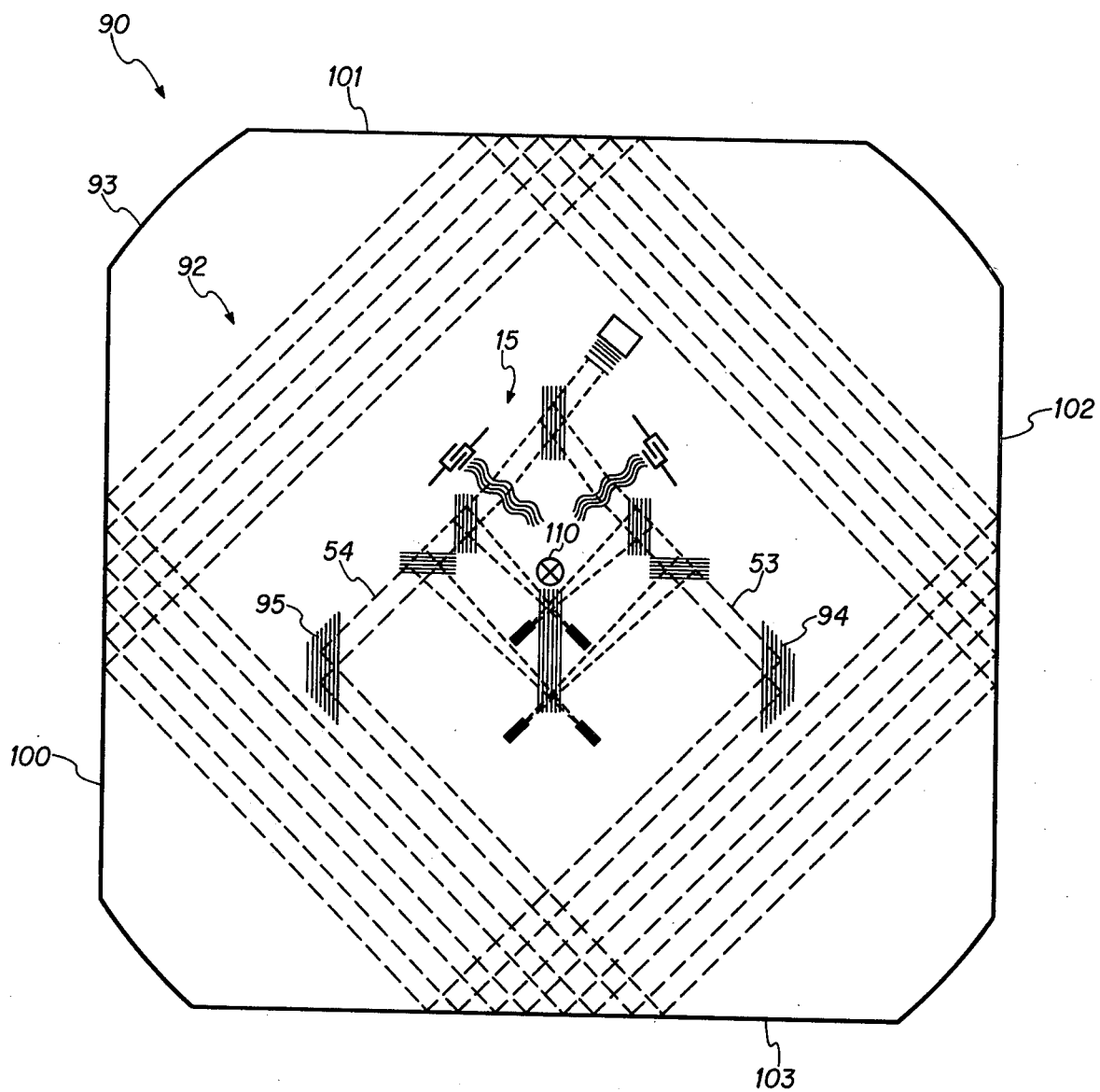
FIG. 6 is a diagrammatic illustration of a plan view of another embodiment of the invention in which the optical path encompassing an axis of sensitivity is completely self-contained on a signal generating and processing chip.

Another embodiment of the invention is illustrated in FIG. 6, and is denoted generally by the reference numeral 90. As shown in FIG. 6, the beam generating and processing portions 15 of the gyro 90 are the same as those described above with reference to the gyroscope 10 of FIGS. 1-5. The beams 53 and 54, produced by the circuit 15, rather than being directed or focused into an optical fiber are conducted about a path 92 encircling the waveguide 93. The establishment of the optical path 92 is achieved by grating Bragg-type reflectors 94 and 95 onto which beams 53 and 54 are respectively directed. The edges 100, 101, 102, and 103 are formed by establishing a cleaved edge at respective squared locations to enable the light beams 53 and 54 to encircle the chip a number of times, as shown, and to be received by the respective opposite reflector 95 and 94. It should be noted that cleaved edges on semiconductor waveguides produce essentially total internal reflection at the edge and, therefore, are highly efficient in maintaining the integrity of the beam along the optical path 92.

In the embodiment illustrated, the path 92 encircles an axis 110, the rotation of the interferometer gyroscope 90 about which is desired to be measured. The external processing circuitry can be that as described in said copending patent application Ser. No. 936,678.

Figure 7:
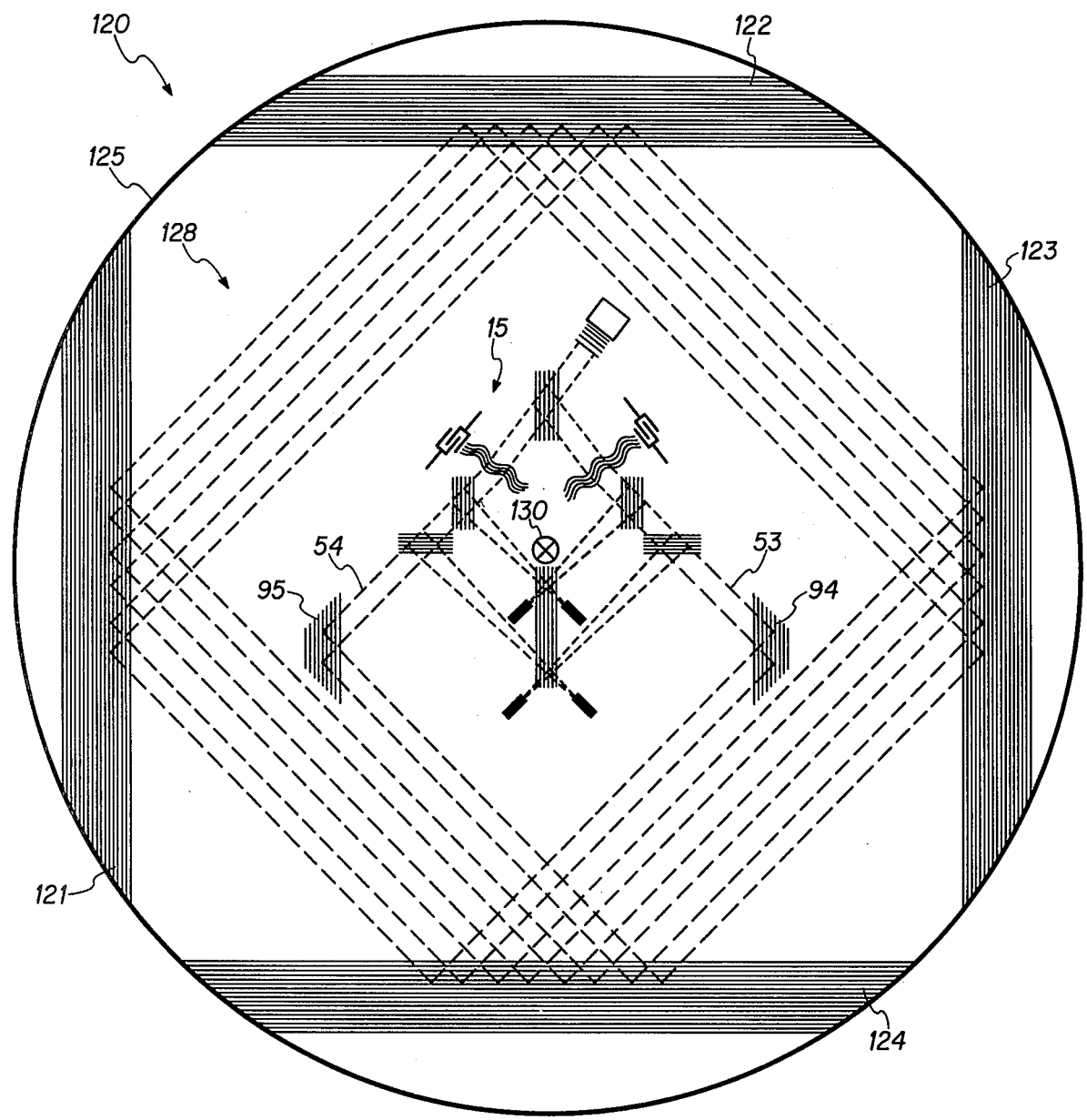
FIG. 7 is a diagrammatic illustration of another embodiment of the interferometer gyro in accordance with the principles of the invention in which the optical path encompassing an axis of sensitivity is contained on a single chip together with the associated optical and electrical circuitry used in conjunction therewith.

Another alternative embodiment of the interferometer gyroscope in accordance with the principles of the invention is shown in FIG. 7, and is denoted by reference numeral 120. Like the gyroscopes of FIGS. 1 and 6, the gyroscope of FIG. 7 includes a signal generating and processing portion 15 which generates respective output beams 53 and 54. The beams 53 and 54 are reflected by reflection type Bragg-type reflectors 94 and 95. Reflection type Bragg-type reflectors 121, 122, 123, and 124 are provided on the waveguide 125 to reflect the beams 53 and 54 to produce the continuous optical path 128 shown. Thus, the gyroscope 120 has an axis of sensitivity 130 approximately centrally located thereon about which rotation can be measured.

Figure 8:
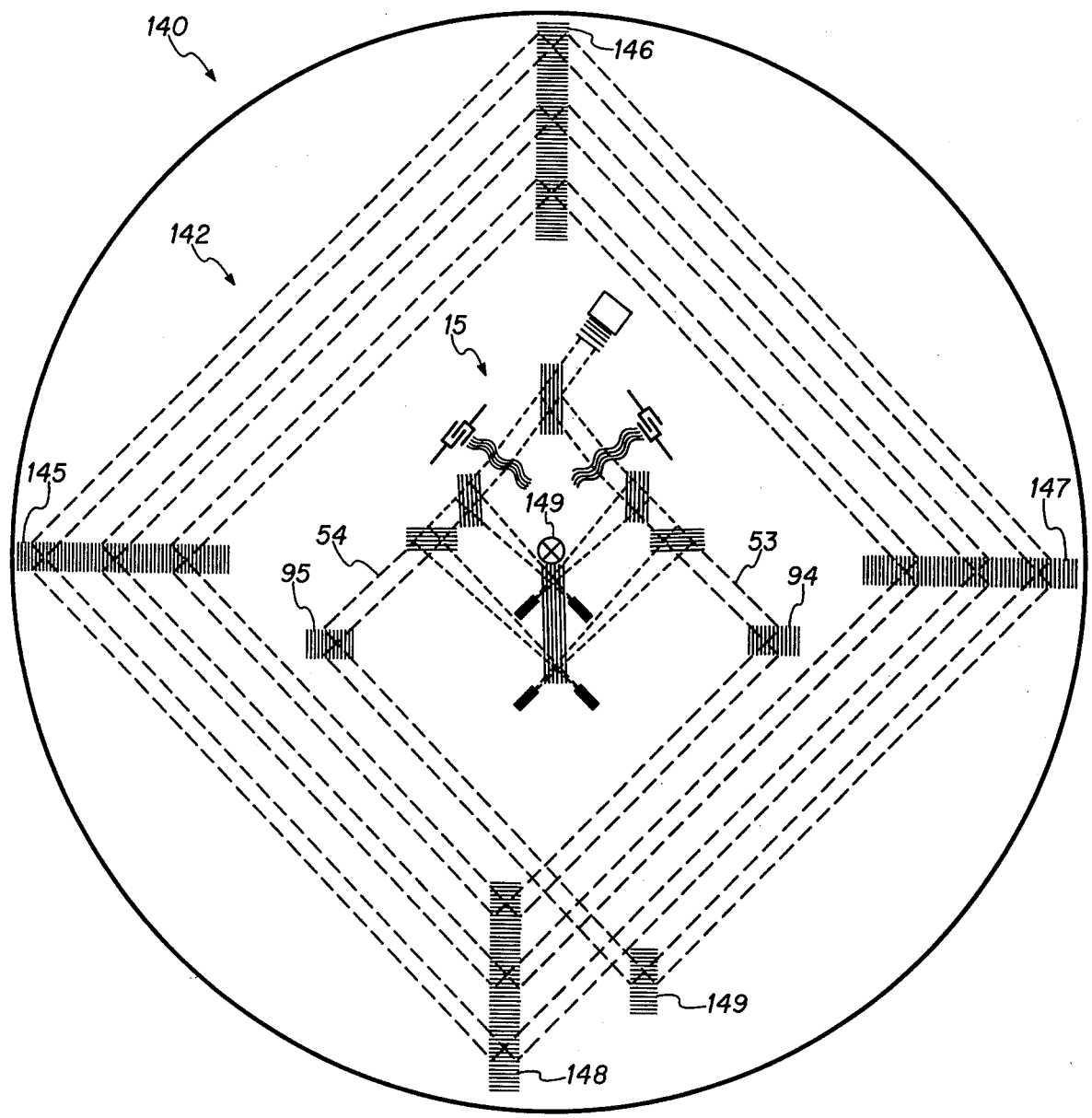
FIG. 8 is another alternative embodiment of the interferometer gyroscope of the invention using reflection type Bragg-type reflectors to define an optical path encircling an axis of sensitivity, and in which the optical path and the associated optical and electrical components are contained on a single semiconductor chip.

Another embodiment of the gyroscope in accordance with the invention is illustrated in FIG. 8 and denoted by the reference numeral 140. The gyroscope 140 also includes a circuit portion 15 similar to that above described with reference to FIGS. 1-5, to generate respective output beams 53 and 54. The beams 53 and 54 are directed onto grating Bragg-type reflectors 94 and 95 in fashion similar to that above described with reference to FIGS. 6 and 7. The reflected beams from the reflectors 94 and 95 are directed in and along the optical path 142 formed by transmission grating Bragg-type deflectors 145, 146, 147, and 148. An additional transmission grating Bragg-type deflector 149 is provided to enable the optical path to complete a closed loop; that is, to ensure that the beam properly impinges upon the transmission grating Bragg-type deflector 95 to reenter the processing circuit 15 for appropriate processing. In a manner similar to that described with reference to FIGS. 6 and 7, the gyroscope of FIG. 8 has an axis of rotational sensitivity 149 approximately centrally located therein about which a rotation of the gyroscope can be measured.

Although the invention has been described and illustrated with a certain degree of particularity, it is understood that numerous changes in the arrangement and combination of parts may be resorted to by those skilled in the art without departing from the spirit and the scope of the invention as hereinafter claimed.

We claim:
1. An interferometer gyroscope, comprising:
   a substrate,
   a single optical waveguide layer on said substrate, said waveguide layer being configured in a single plane,
   a source of laser light,
   means for introducing said laser light from said source into said optical waveguide layer in a single beam,
   means for dividing said single beam into first and second beams in said optical waveguide layer,
   means for directing said first and second beams in opposite directions along a path encompassing an axis of rotational sensitivity,
   means for receiving said first and second beams from said path and directing said first and second beams in said optical waveguide layer for detection,
   and means for detecting a phase difference between said received first and second beams to indicate a rotation of said gyroscope about said axis of rotational sensitivity.

2. The interferometer gyroscope of claim 1 wherein said means for directing said first and second beams in opposite directions along a path encompassing an axis of rotational sensitivity comprises:
   a length of optical fiber configured about said axis of rotational sensitivity in multi-encircling path thereabout,
   and means for coupling said first and second beams between said optical waveguide and said optical fiber.

3. The interferometer gyroscope of claim 2 wherein said coupling means comprises means for constraining respective ends of said optic fiber in respective grooves in said substrate with an axis of said optic fiber in paralled alignment with said optical waveguide.

4. The interferometer gyroscope of claim 3 wherein said coupling means further comprises a thin-film Luneburg lens in said optical waveguide adjacent said groove.

5. The interferometer gyroscope of claim 3 wherein said means for constraining respective ends of said optic fiber comprises a first cement for mechanically adhering said fiber within said grooves and an optical contact cement for providing optical contact at an end of the fiber.

6. The interferometer gyroscope of claim 1 wherein said means for directing said first and second beams in opposite directions along a path encompassing an axis of rotational sensitivity comprises:

means for reflecting said first and second beams within said optical waveguide to encompass said axis of rotational sensitivity, said reflecting means constraining said first and second beams to path entirely within said optical waveguide.

7. The interferometer gyroscope of claim 6 wherein said means for reflecting comprises a cleaved edge formed at each location of reflection.

8. The interferometer gyroscope of claim 6 wherein said reflecting means comprises a reflection-type, Bragg-type reflector located at each location of reflection.

9. The interferometer gyroscope of claim 6 wherein said reflection means comprises a transmission-grating, Bragg-type deflector at each location of reflection.

10. The interferometer gyroscope of claim 1 wherein said means for introducing said laser light from said source into said optical waveguide in a single beam comprises a chirp grating coupler formed in said optical waveguide.

11. An interferometer gyroscope, comprising:
a silicon substrate
an isolation layer on said substrate
an ultra low loss in-diffused silicon dioxide waveguide overlying said isolation layer,
a distributed feedback (GaAl)As laser to provide laser light,
a chip grating in said silicon dioxide layer for introducing laser light into said silicon dioxide layer in single beam,
a grating beam splitter in said silicon dioxide layer for dividing said single beam into first and second beams in said silicon dioxide layer,
means in said silicon dioxide layer for modulating said first and second beams with respective first and second frequencies,
means for directing said modulated first and second beams in opposite directions along a path having an axis of rotational sensitivity,
means in said silicon dioxide layer for receiving said modulated first and second beams from said path,
and means for producing a first difference signal from said first and second frequencies of said modulating means and for producing a second difference signal from said received modulated first and second beams, and for detecting a phase difference between said first and second difference signals to indicate a rotation of said gyroscope about said axis of rotational sensitivity.

12. An interferometer gyroscope, comprising:
a planar optical waveguide,
a source of laser light,
means for introducing said laser light into said planar optical waveguide,
means in said planar optical waveguide for dividing said laser light into first and second beams in said planar optical waveguide,
means for directing said first and second beams in opposite directions along a path having an axis of rotational sensitivity, said path being contained in a single plane entirely within said planar optical waveguide,
means in said planar optical waveguide for receiving said first and second beams from said path and directing said first and second beams in said planar optical waveguide for detection,
and means for detecting a phase difference between said received first and second beams to indicate a rotation of said gyroscope about an axis of rotational sensitivity.

13. The interferometer gyroscope of 12 wherein said means for reflecting is at least one cleaved edge.

14. The interferometer gyroscope of 12 wherein said means for reflecting is at least one reflection-type, Bragg-type reflector.

15. The interferometer gyroscope of 12 wherein said reflecting means is at least one transmission-grating, Bragg-type deflector.

16. The interferometer gyroscope in accordance with claims 12, 13, 14 or 15, wherein said reflecting means are disposed to reflect said first and second beams in at least one quadralateral path.

17. The interferometer gyroscope of 12 wherein said planar optical waveguide comprises:
a substrate
an isolation layer formed on said substrate
and a silicon dioxide layer overlying said isolation layer.

18. An interferometer gyroscope comprising:
a substrate
a single silicon dioxide layer overlying at least a portion of said substrate,
a source of laser light introduced into said silicon dioxide layer,
means for dividing said laser light into first and second beams in said silicon dioxide layer,
means for directing said first and second beams in opposite directions, along a path having an axis of rotational sensitivity,
means for receiving said first and second beams in said silicon dioxide layer from said path,
and means for comparing said received first and second beams for producing an indication of rotation of said gyroscope about said axis of rotational sensitivity.

19. The interferometer gyroscope of claim 18 further comprising means for reflecting said first and second beams to constrain said first and second beams to within said planar optical waveguide to define said path entirely therewithin.

20. The interferometer gyroscope of 19 wherein said means for reflecting is at least one cleaved edge.

21. The interferometer gyroscope of 19 wherein said means for reflecting is at least one reflection-type, Bragg-type reflector.

22. The interferometer gyroscope of 19 wherein said reflecting means is at least one transmission-grating, Bragg-type deflector.

23. The interferometer gyroscope in accordance with claims 19, 20, 21, or 22, wherein said reflecting means are disposed to reflect said first and second beams in at least one quadralateral path.

24. The interferometer gyroscope of 1 wherein said planar optical waveguide comprises:
a substrate
an isolation layer formed on said substrate
and a silicon dioxide layer overlying said isolation layer.

* * * * *